Aug. 21, 1956 E. B. MAILLART 2,759,188
DEVICE FOR CONNECTING FACE PROTECTIVE
EQUIPMENT TO SKULLGUARDS
Filed July 21, 1953 2 Sheets-Sheet 1

INVENTOR.
EDMOND B. MAILLART
BY
Joshua R. H. Potts
HIS ATTORNEY.

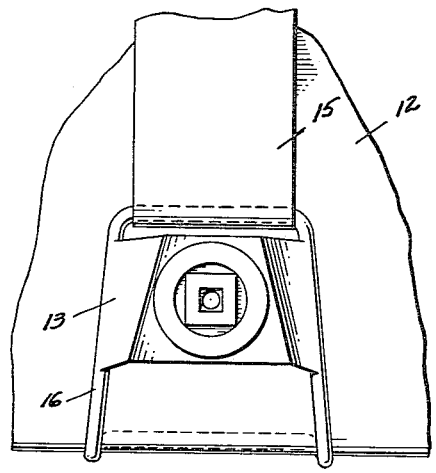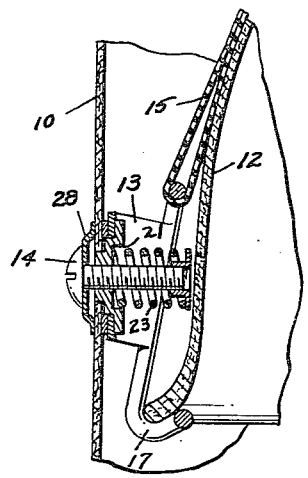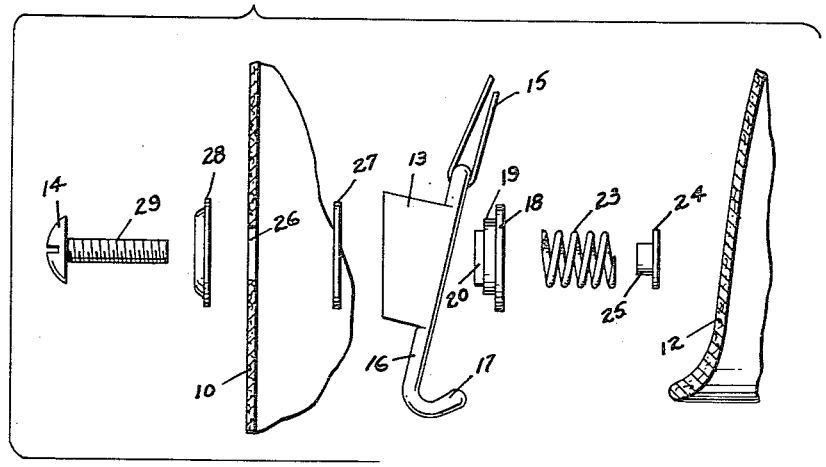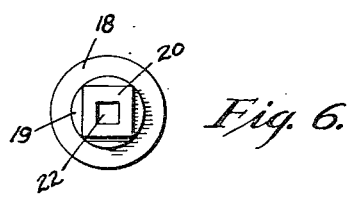

United States Patent Office 2,759,188
Patented Aug. 21, 1956

2,759,188

DEVICE FOR CONNECTING FACE PROTECTIVE EQUIPMENT TO SKULLGUARDS

Edmond B. Maillart, Media, Pa., assignor to The Fibre Metal Products Co., Chester, Pa., a corporation of Pennsylvania Application July 21, 1953, Serial No. 369,380

2 Claims. (Cl. 2—10)

This invention relates to welding helmets or masks and is concerned primarily with a detachable clip connection for mounting such a welding helmet on a skullguard or other headgear.

Within recent years a type of safety hat known as a "skullguard" has come into widespread usage throughout the various industries. These skullguards are usually made from a rigid material, such as phenolic impregnated fabric, fiberglass bonded with polyester resin, molded nylon and the like. Not only are these skullguards kept available for the safety of the workers as a matter of policy by the employer, but in many States their use is required by statutory regulations providing for the safety and welfare of the workers.

While such skullguards are generally required to be worn continuously by the worker in certain hazardous industrial environents, there are occasions when an additional protective device, such as a welding helmet or other face protective equipment, must be worn more or less intermittently therewith. It is therefore desirable that provision be made for detachably mounting a welding helmet on a skullguard, and at the same time it is important that the connection between the two be firm and secure to provide the proper anchorage for the helmet.

In the patent to Frederick M. Bowers, No. 2,362,610, there is disclosed a connection for detachably mounting a welding helmet to a skullguard. The connection disclosed in that patent requires the use of a bracket member which must be fixedly secured to the skullguard. This, of course, necessitates the drilling of holes in the skullguard so as to accommodate the bracket. In addition, with this type of connection the nose clearance, i. e. the distance between the front edge of the skullguard and the inside of the welding helmet, is a fixed distance and is thus not susceptible to adjustment.

It is an object of this invention, therefore, to provide an improved connection for detachably attaching a welding helmet to a skullguard.

It is another object of this invention to provide an improved connection for detachably attaching a welding helmet to a skullguard without drilling any holes in the skullguard and without the necessity of attaching any hardware thereto in permanent fashion.

Still another object of this invention is to provide a connection for detachably attaching a welding helmet to a skullguard which permits adjustment of the nose clearance.

A further object of this invention is the provision of a connection for detachably attaching a welding helmet to a skullguard adapted to fit all types and styles of skullguards.

These objects, together with some of the advantages to be derived in utilizing the present invention, will become apparent from the following detailed description and from the accompanying drawings describing the preferred embodiment of this invention in which similar numerals refer to similar parts throughout the several views.

Figure 3 is a side elevational view of the clip of the present invention mounted on the skullguard, the welding helmet not being shown.

Figure 4 is a detailed sectional view of the connection of this invention taken along the line 4—4 of Fig. 1, and illustrating in detail the structure of the clip and how it attaches the helmet to the skullguard.

Figure 5 is an exploded view showing the relationship of the parts of the clip connection to the welding helmet and skullguard.

Figure 6 is an elevational view of a bearing member shown in Fig. 5.

Figure 1:
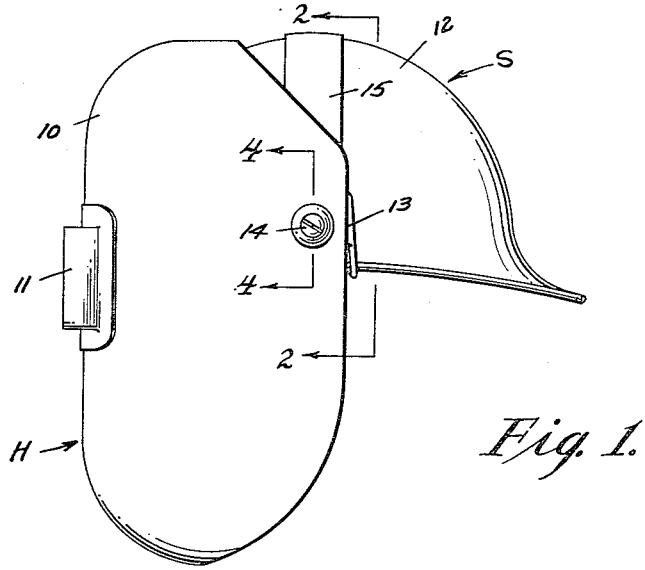
Figure 1 is a view in side elevation of a welding helmet mounted on a skullguard by the detachable connection of this invention.

Referring now to the drawings, a welding helmet is referred to in its entirety by the reference character H. This helmet H includes a mask 10 of the usual fibre composition and an eyepiece 11. A skullguard is represented at S. This skullguard includes a hard outer-shell 12 which may be made from any appropriate material having the required properties of hardness, rigidity and strength, such as fiberglass, nylon, and the like. The skullguard is positioned on the head by means of a suspension harness within the skullguard (not shown).

The welding helmet H is attached to the skullguard S in detachable fashion by means of the connection means shown in Figs. 2 through 6, inclusive. Referring to said figures, a pair of clip members 13, attached to the welding mask 10 by means of the bolts 14, and to the skullguard by means of the flexible band 15, traversing the top of the skullguard outer-shell 12, hold the welding helmet and skullguard in assembled relationship. Inasmuch as both clip members 13 are identical, further discussion will be limited to just one of such members.

The clip member 13 which is preferably made from steel is provided with a marginal tubular structure 16 bent upward at its bottom forming a hook 17 which is preferably dipped in rubber or the like so as to provide a scratch resistant coating thereon and to reduce slippage. Situated on the skullguard side of the clip 13 in adjacent relationship thereto is a bearing member 18 having a circular shoulder 19 and a square-shaped shoulder 20 extending therefrom, the said shoulders passing through an opening provided therefor in the clip member 13. The bearing member is provided with a cylindrical recess 21, and a square-shaped aperture 22 is provided in the shoulders 19 and 20 in coaxial alignment with said cylindrical recess. Situated in the recess 21 is a coil spring 23, the opposite end thereof bearing against the flange 24 of the collar 25 which resides on the inside of the coil spring 23. The collar 25 is provided with an internally threaded opening for a purpose to be later described.

The mask 10 is provided with a square-shaped opening 26, shown in Fig. 5, adapted to receive the square-shaped shoulder 20 of the bearing member 18 so as to preclude the relative rotation of the mask 10 therewith. Situated between the inside surface of the mask 10 and the outside surface of the clip 13 is a washer 27 which circumscribes the circular shoulder 19 of the bearing member 18. Adjacent to the outside surface of the mask 10 is a washer member 28. A bolt 14 having a threaded shank 29, threadably engages the internal threaded portion of the collar 25, holding the various parts described above in assembled relationship as shown in cross-sectional detail in Fig. 4.

Figure 2:
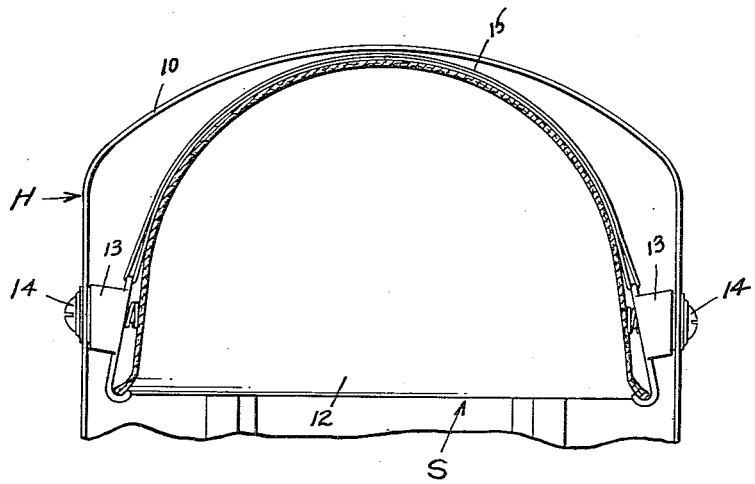
Figure 2 is an enlarged detailed view in section taken along the line 2—2 of Fig. 1.

To detachably attach the welding helmet and clip members to the skullguard, a flexible band 15, preferably made from neoprene, is looped through the upper portion of the marginal tubular structure 16, passing over the crown of the hard outer-shell 12, while the hook 17 engages the bottom peripheral rim of the skullguard, as shown in Figs. 2 through 4. The natural resistance of the neoprene band 15 to stretching thus retains the welding helmet and clip in a stable relationship with the skullguard, while the resistance to compression of the springs 23 maintain a stable transverse relationship of the welding helmet to the skullguard.

From the above description, it becomes apparent that a novel connection is provided for detachably attaching a welding helmet to a skullguard without the necessity of drilling holes in the skullguard or permanently affixing a bracket thereto. Furthermore, the neoprene band used for joining the two members, being flexible, can adapt itself to a variety of skullguard contours without any sacrifice in the efficiency of the juncture of the helmet thereto. In addition, it will be noted that since the clip 13 is not fixedly attached to the skullguard by means of screws, as in the conventional bracket connection, the nose clearance may be adjusted by simply moving the skullguard forward or backward within the hook 17 of the clip member, as desired, relative to the position of the mask 10, and the skullguard will remain in this position by virtue of the frictional resistance provided by the rubber coating on the hook 17. And lastly, inasmuch as skullguard rims are substantially standardized, the clip connection of the present invention will fit almost any type and style of skullguard with equal success.

Although the present description of this invention has been limited to the above-described embodiment, other variations thereof are possible without departing from the spirit of the invention. It is therefore not intended that the invention be limited to the particular embodiment disclosed but only to the inventive concept as defined in the appended claims.

What is claimed is:

1. A detachable connection for face protective equipment comprising, a pair of hooklike clip members each consisting of a body portion having an aperture therein and a marginal tubular portion circumscribing said body portion, said tubular portion being turned upwardly at the bottom point thereof so as to form a hook, a tension band joined to said tubular portion opposite from said hook, a bearing member having a circular shoulder received in said clip aperture and having a square-shaped shoulder extending therefrom, said bearing member being provided with a cylindrical recess and a centrally located aperture, a coil spring having one end received in said recess and its opposite end bearing against a flanged collar, said collar having an internally threaded bore, a pair of washers on the side of said clip remote from said bearing member, and a threaded bolt passing through said washers and bearing member with the end thereof threadably received in said collar.

2. A detachable connection for face protective equipment comprising, a pair of hooklike clip members each consisting of a body portion having an aperture therein and a marginal tubular portion circumscribing said body portion, the body portion being offset relative to the tubular portion, said tubular portion being turned upwardly at the bottom point thereof so as to form a hook, a tension band joined to said tubular portion opposite from said hook, a bearing member having a circular shoulder received in said clip aperture and having a square-shaped shoulder extending therefrom, said bearing member being provided with a cylindrical recess and a centrally located aperture, a coil spring having one end received in said recess and its opposite end bearing against a flanged collar, said collar having an internally threaded bore, a pair of washers on the side of said clip remote from said bearing member, and a threaded bolt passing through said washers and bearing member with the end thereof threadably received in said collar.

References Cited in the file of this patent

UNITED STATES PATENTS

| | | |
|---|---|---|
| 1,202,513 | Gudger | Oct. 24, 1916 |
| 1,741,327 | Merlino | Dec. 31, 1929 |
| 2,111,747 | Bowers | Mar. 22, 1938 |
| 2,250,896 | Stokesbary | July 29, 1941 |
| 2,360,101 | Bowers | Oct. 10, 1944 |
| 2,415,214 | Lewis | Feb. 4, 1947 |

FOREIGN PATENTS

| | | |
|---|---|---|
| 79,630 | Austria | Dec. 29, 1919 |